US011882979B2

(12) United States Patent
Durham et al.

(10) Patent No.: US 11,882,979 B2
(45) Date of Patent: Jan. 30, 2024

(54) CENTRIFUGAL PUMP DIFFUSER HOUSINGS

(71) Applicant: Haier US Appliance Solutions, Inc., Wilmington, DE (US)

(72) Inventors: Kyle Edward Durham, Louisville, KY (US); Adam Christopher Hofmann, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/826,372

(22) Filed: May 27, 2022

(65) Prior Publication Data

US 2023/0380655 A1 Nov. 30, 2023

(51) Int. Cl.
*A47L 15/42* (2006.01)
*F04D 29/62* (2006.01)
*F04D 29/44* (2006.01)

(52) U.S. Cl.
CPC ........ *A47L 15/4225* (2013.01); *F04D 29/448* (2013.01); *F04D 29/628* (2013.01); *F05D 2250/52* (2013.01)

(58) Field of Classification Search
CPC .... F04D 29/448; F04D 29/628; F04D 29/445; F04D 29/44; F05D 2250/52
See application file for complete search history.

(56) References Cited

U.S. PATENT DOCUMENTS 5,474,422 A * 12/1995 Sullivan ................ F04D 29/626 415/206
7,025,576 B2 * 4/2006 Chaffee ................... F04D 25/06 417/366
9,011,095 B2 * 4/2015 Parker ................... F04D 29/628 415/206
9,839,339 B2 12/2017 Dries
10,349,809 B2 7/2019 Dries et al.
10,349,810 B2 7/2019 Dries et al.
11,085,460 B2 8/2021 Japikse
2018/0156233 A1 * 6/2018 Sawada ................... F04D 25/06
2020/0237180 A1 * 7/2020 Dries ....................... A47L 15/14
2020/0408222 A1 12/2020 Japiske

FOREIGN PATENT DOCUMENTS

JP 2017082658 A 5/2017

* cited by examiner

*Primary Examiner* — Courtney D Heinle
*Assistant Examiner* — Andrew Thanh Bui
(74) *Attorney, Agent, or Firm* — Dority & Manning, P.A.

(57) ABSTRACT

An appliance includes a tub defining a wash chamber, and a centrifugal pump in fluid communication with the wash chamber. The centrifugal pump includes a motor housing, a motor disposed in the motor housing, and a fluid impeller coupled to the motor. A diffuser housing assembly includes a first diffuser housing portion and a second diffuser housing portion. The first diffuser housing portion includes a groove and the second diffuser housing portion includes an extrusion. A diffuser vane is positioned on the motor housing. The diffuser vane engages in the groove of the first diffuser housing portion. The extrusion of the second diffuser housing portion encloses the diffuser vane into the diffuser housing assembly.

14 Claims, 7 Drawing Sheets

CENTRIFUGAL PUMP DIFFUSER HOUSINGS

FIELD OF THE INVENTION

The present subject matter relates generally to centrifugal pump diffuser housings.

BACKGROUND OF THE INVENTION

Dishwashers assist with cleaning of various items, including dishes, tableware, glassware, pots, pans, and utensils. During operation, a sump of the dishwasher is frequently filled with a wash fluid, such as a mix of water and detergent, which is pumped to one or more sprayers in order to clean items within the dishwasher with the cleaning mixture. Conventionally, a centrifugal pump is used as the sump in dishwasher appliances.

Centrifugal pumps typically have diffuser vanes in order to increase the efficiency of the pump by reducing turbulence in the fluid flow paths. The diffuser vanes are arranged within the centrifugal pump such that recirculation from the high pressure and lower pressure sides of the centrifugal pump is limited to reduce turbulence in the fluid flow paths. Known diffuser vanes have geometries that prevent high speed manufacturing as the parts cannot be easily injection molded.

BRIEF DESCRIPTION OF THE INVENTION

Aspects and advantages of the invention will be set forth in part in the following description, or may be apparent from the description, or may be learned through practice of the invention.

In one example embodiment, an appliance includes a tub defining a wash chamber, and a centrifugal pump in fluid communication with the wash chamber. The centrifugal pump includes a motor housing, a motor disposed in the motor housing, and a fluid impeller coupled to the motor. A diffuser housing assembly includes a first diffuser housing portion and a second diffuser housing portion. The first diffuser housing portion includes a groove and the second diffuser housing portion includes an extrusion. A diffuser vane is positioned on the motor housing. The diffuser vane engages in the groove of the first diffuser housing portion. The extrusion of the second diffuser housing portion encloses the diffuser vane into the diffuser housing assembly.

In another example embodiment, a centrifugal pump includes a motor housing, a motor disposed in the motor housing, and a fluid impeller coupled to the motor. A diffuser housing assembly includes a first diffuser housing portion and a second diffuser housing portion. The first diffuser housing portion includes a groove, and the second diffuser housing portion includes an extrusion. A diffuser vane is positioned on the motor housing. The diffuser vane engages in the groove of the first diffuser housing portion. The extrusion of the second diffuser housing portion sealingly enclosing the diffuser vane into the diffuser housing assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
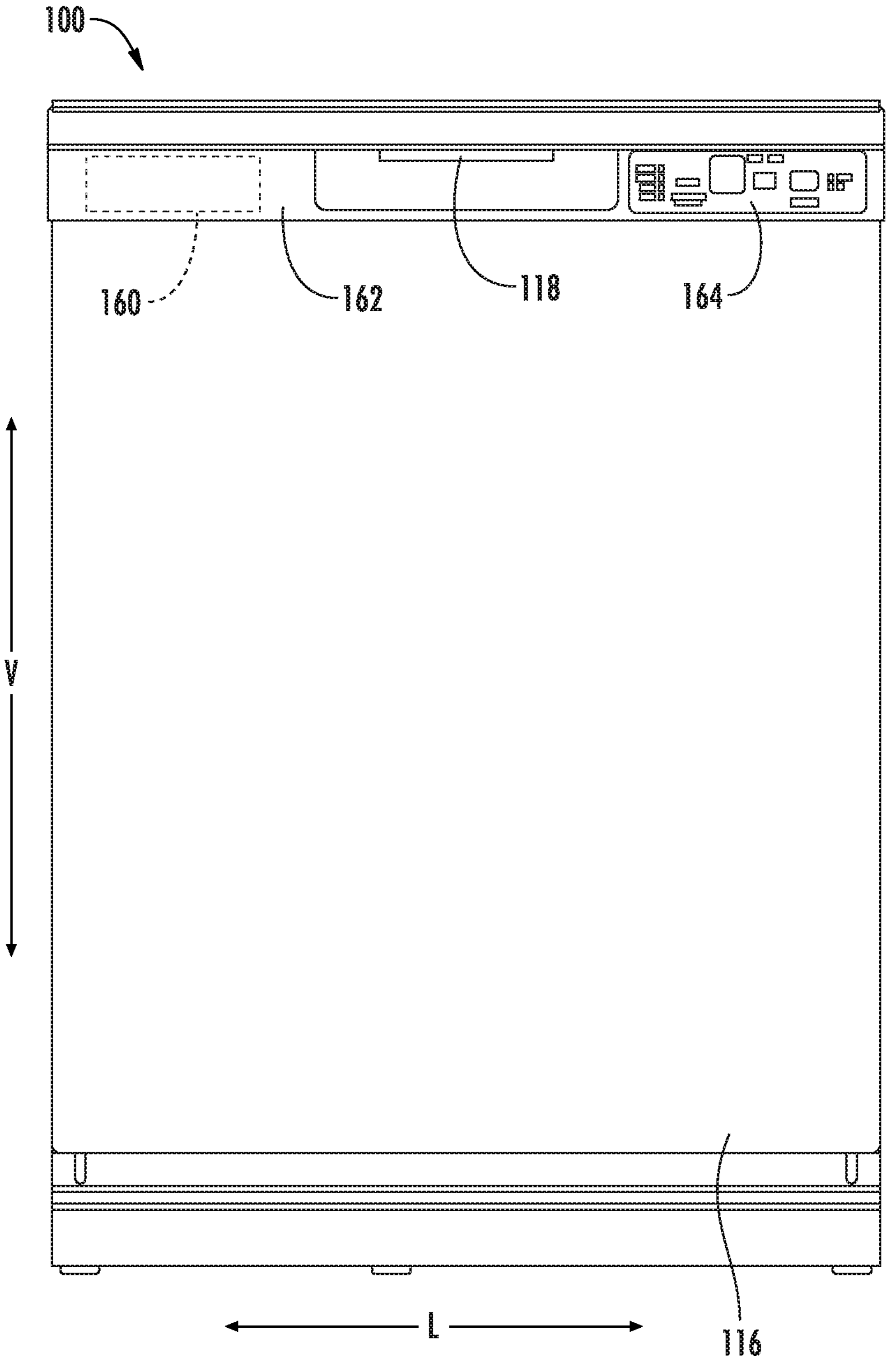
FIG. 1 provides a front view of an example embodiment of a dishwashing appliance of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For instance, "upstream" refers to the flow direction from which the fluid flows, and "downstream" refers to the flow direction to which the fluid flows. The term "article" may refer to, but need not be limited to dishes, pots, pans, silverware, and other cooking utensils and items that can be cleaned in a dishwashing appliance.

The term "wash cycle" is used to refer to an overall operation of the dishwashing appliance which may include two or more distinct phases. The term "wash phase" is intended to refer to one or more periods of time during which a dishwashing appliance operates while containing the articles to be washed and uses a wash liquid (e.g., water, detergent, or wash additive) and may be a portion of the wash cycle, such as a beginning or early portion of the wash cycle. The term "rinse phase" is intended to refer to one or more periods of time during which the dishwashing appliance operates to remove residual soil, detergents, and other undesirable elements that were retained by the articles after completion of the wash phase and may be a portion of the wash cycle, such as an intermediate portion of the wash cycle. The term "drain phase" is intended to refer to one or more periods of time during which the dishwashing appliance operates to discharge soiled water from the dishwashing appliance and may be a portion of the wash cycle, such as a later portion of the wash cycle. The term "wash liquid" refers to a liquid used for washing or rinsing the articles that is typically made up of water and may include additives, such as detergent or other treatments (e.g., rinse aid). Furthermore, as used herein, terms of approximation, such as "generally," "approximately," "substantially," or "about," refer to being within a ten percent (10%) margin of error. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
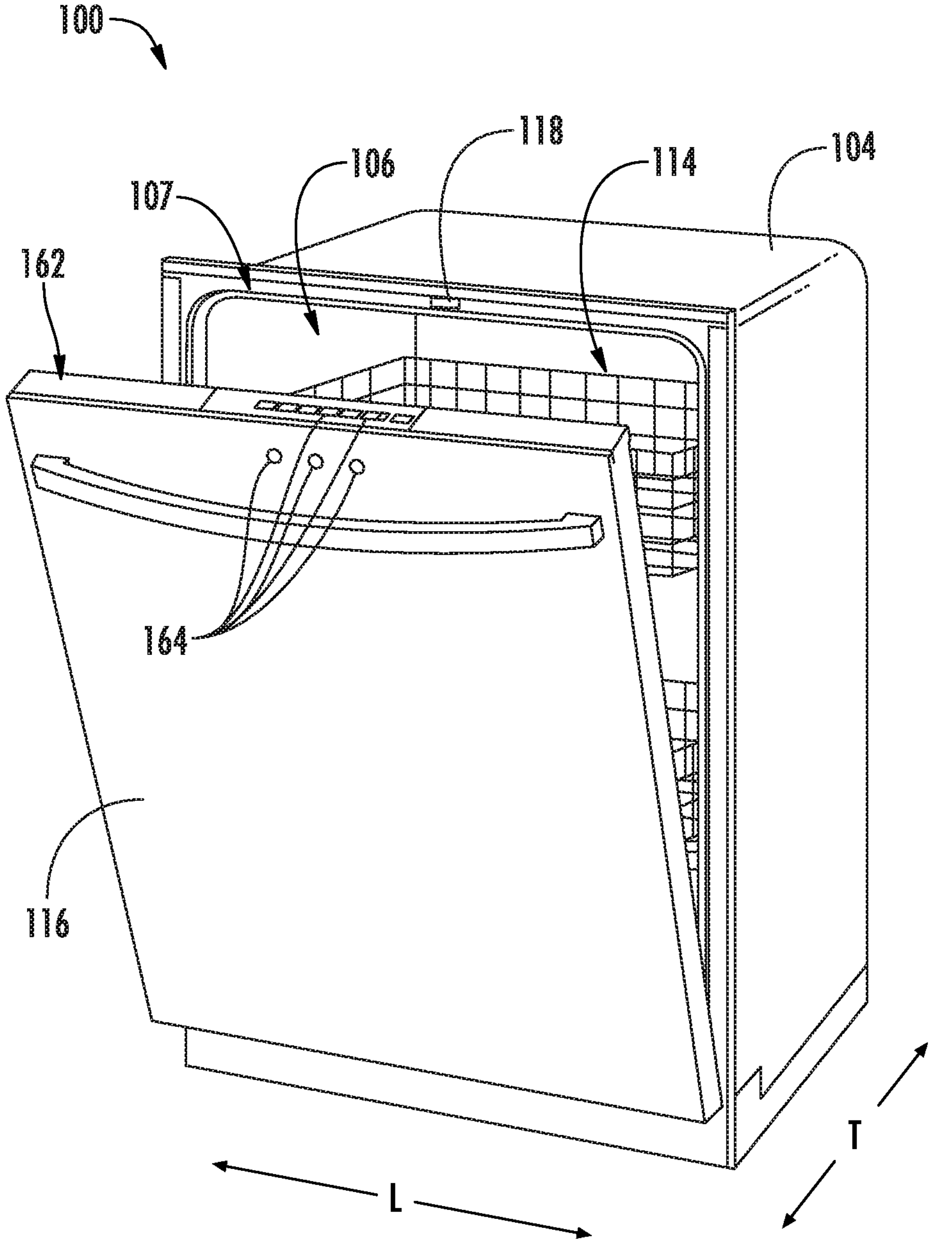
FIG. 2 provides a perspective view of the example dishwashing appliance of FIG. 1 with a door in an intermediate position.
Figure 3:
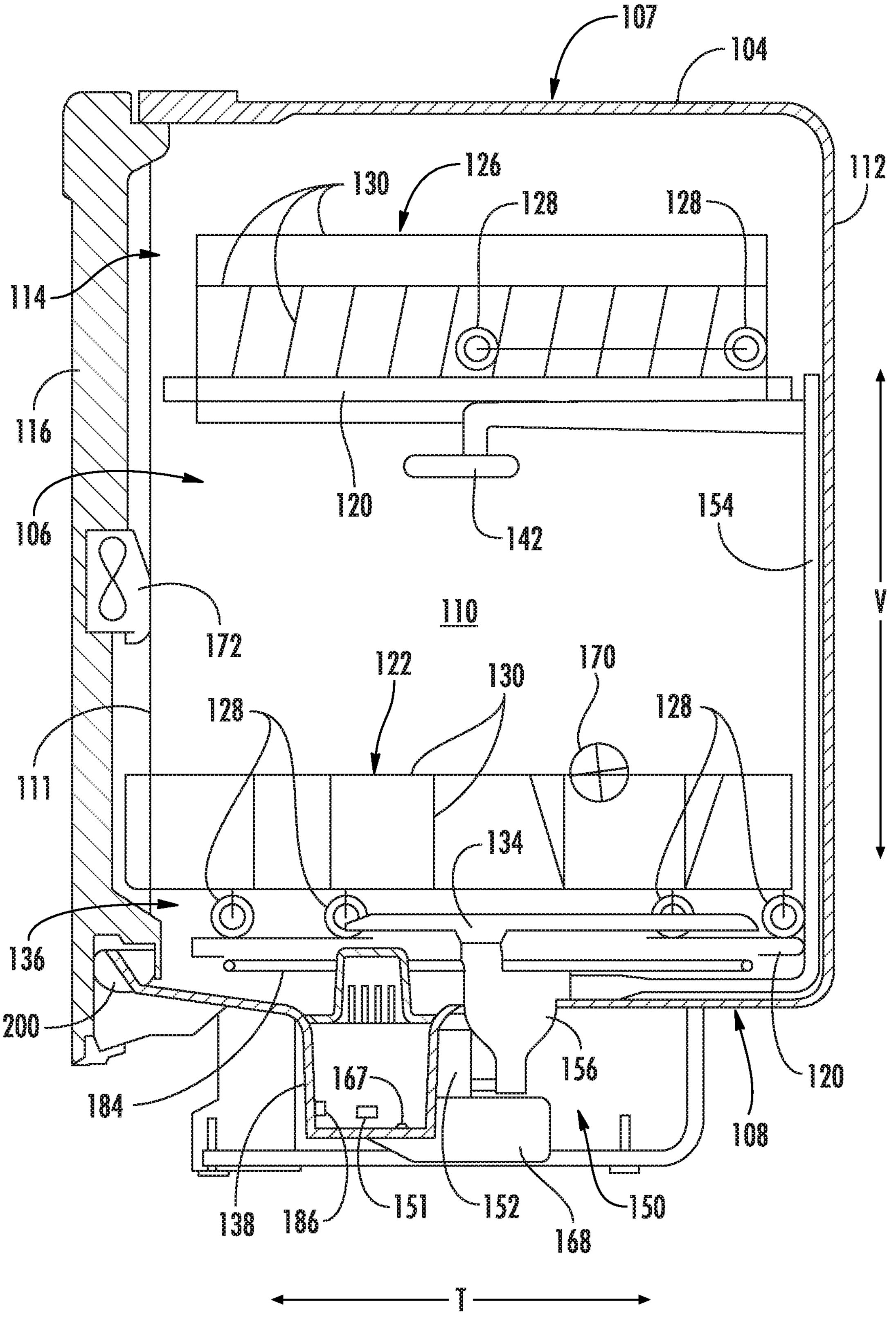
FIG. 3 provides a side, cross section view of the example dishwashing appliance of FIG. 1.

Turning now to the figures, FIGS. 1 through 3 depict an exemplary dishwasher or dishwashing appliance (e.g., dishwashing appliance 100) that may be configured in accordance with aspects of the present disclosure. Generally, dishwasher 100 defines a vertical direction V, a lateral direction L, and a transverse direction T. Each of the vertical direction V, lateral direction L, and transverse direction T are mutually perpendicular to one another and form an orthogonal direction system.

Dishwasher 100 includes a tub 104 that defines a wash chamber 106 therein. As shown in FIG. 3, tub 104 extends between a top 107 and a bottom 108 along the vertical direction V, between a pair of side walls 110 along the lateral direction L, and between a front side 111 and a rear side 112 along the transverse direction T.

Tub 104 includes a front opening 114 at the front side 111. In some embodiments, the dishwashing appliance 100 may also include a door 116 at the front opening 114. The door 116 may, for example, be coupled to the tub 104 by a hinge 200 at its bottom for movement between a normally closed vertical position (FIGS. 1 and 3), wherein the wash chamber 106 is sealed shut for washing operation, and a horizontal open position (not shown) for loading and unloading of articles from dishwasher 100. A door closure latch 118, e.g., may be provided to lock and unlock door 116 for accessing and sealing wash chamber 106.

In exemplary embodiments, tub side walls 110 accommodate a plurality of rack assemblies. For instance, guide rails 120 may be mounted to side walls 110 for supporting a lower rack assembly 122 and an upper rack assembly 126. In some such embodiments, upper rack assembly 126 is positioned at a top portion of wash chamber 106 above lower rack assembly 122 along the vertical direction V.

Generally, each rack assembly 122, 126 may be adapted for movement between an extended loading position (not shown) in which the rack is substantially positioned outside the wash chamber 106, and a retracted position (shown in FIGS. 1 through 3) in which the rack is located inside the wash chamber 106. In some embodiments, movement is facilitated, for instance, by rollers 128 mounted onto rack assemblies 122, 126, respectively.

Although guide rails 120 and rollers 128 are illustrated herein as facilitating movement of the respective rack assemblies 122, 126, it should be appreciated that any suitable sliding mechanism or member may be used according to alternative embodiments.

In optional embodiments, some or all of the rack assemblies 122, 126 are fabricated into lattice structures including a plurality of wires or elongated members 130 (for clarity of illustration, not all elongated members making up rack assemblies 122, 126 are shown). In this regard, rack assemblies 122, 126 are generally configured for supporting articles within wash chamber 106 while allowing a flow of wash liquid to reach and impinge on those articles (e.g., during a cleaning or rinsing phase of the wash cycle). According to additional or alternative embodiments, a silverware basket (not shown) may be removably attached to a rack assembly (e.g., lower rack assembly 122), for placement of silverware, utensils, and the like, that are otherwise too small to be accommodated by the rack assembly.

Generally, dishwasher 100 includes one or more spray assemblies for urging a flow of fluid (e.g., wash liquid) onto the articles placed within wash chamber 106.

In exemplary embodiments, dishwasher 100 includes a lower spray arm assembly 134 disposed in a lower region 136 of wash chamber 106 and above a sump 138 so as to rotate in relatively close proximity to lower rack assembly 122. In this regard, lower spray arm assembly 134 may generally be configured for urging a flow of wash liquid up through lower rack assembly 122.

In some embodiments, an upper spray assembly 142 may be located proximate to and, e.g., below, upper rack assembly 126 along the vertical direction V. In this manner, upper spray assembly 142 may be generally configured for urging of wash liquid up through upper rack assembly 126.

The various spray assemblies and manifolds described herein may be part of a fluid distribution system or fluid circulation assembly 150 for circulating wash liquid in tub 104. In certain embodiments, fluid circulation assembly 150 includes a circulation pump 152 for circulating wash liquid in tub 104. Circulation pump 152 may be mounted to sump 138 and in fluid communication with the sump 138 through a circulation outlet 151 from the sump 138.

When assembled, circulation pump 152 may be in fluid communication with an external water supply line (not shown) and sump 138. A water inlet valve (not shown) can be positioned between the external water supply line and circulation pump 152 (e.g., to selectively allow water to flow from the external water supply line to circulation pump 152). Additionally or alternatively, water inlet valve can be positioned between the external water supply line and sump 138 (e.g., to selectively allow water to flow from the external water supply line to sump 138). During use, water inlet valve may be selectively controlled to open to allow the flow of water into dishwasher 100 and may be selectively controlled to close and thereby cease the flow of water into dishwasher 100. Further, fluid circulation assembly 150 may include one or more fluid conduits or circulation piping for directing wash fluid from circulation pump 152 to the various spray assemblies and manifolds. In exemplary embodiments, such as that shown in FIG. 3, a primary supply conduit 154 extends from circulation pump 152, along rear side 112 of tub 104 along the vertical direction V to supply wash liquid throughout wash chamber 106.

In optional embodiments, circulation pump 152 urges or pumps wash liquid to a diverter 156 (FIG. 3). In some such embodiments, diverter 156 is positioned within sump 138 of dishwashing appliance 100). Diverter 156 may include a diverter disk (not shown) disposed within a diverter chamber 158 for selectively distributing the wash liquid to the spray assemblies 134, 142, or other spray manifolds or assemblies. For instance, the diverter disk may have at least one aperture configured to align with one or more outlet ports (not shown) at the top of diverter chamber 158. In this manner, the diverter disk may be selectively rotated to provide wash liquid to the desired spray device(s).

In exemplary embodiments, diverter 156 is configured for selectively distributing the flow of wash liquid from circulation pump 152 to various fluid supply conduits—only some of which are illustrated in FIG. 3 for clarity. In certain embodiments, diverter 156 includes two or more outlet ports (not shown) for supplying wash liquid to a first conduit for rotating lower spray arm assembly 134 and a second conduit for supplying upper spray assembly 142 (e.g., supply conduit 154). Additional embodiments may also include one or more additional conduits, e.g., a third conduit for spraying an auxiliary rack such as a silverware rack, etc.

In some embodiments, a supply conduit 154 is used to supply wash liquid to one or more spray assemblies (e.g., to upper spray assembly 142). It should be appreciated, however, that according to alternative embodiments, any other suitable plumbing configuration may be used to supply wash liquid throughout the various spray manifolds and assemblies described herein. For instance, according to another exemplary embodiment, supply conduit 154 could be used to provide wash liquid to lower spray arm assembly 134 and a dedicated secondary supply conduit (not shown) could be utilized to provide wash liquid to upper spray assembly 142. Other plumbing configurations may be used for providing wash liquid to the various spray devices and manifolds at any location within dishwashing appliance 100.

Each spray assembly 134 and 142, or other spray device as may be included in dishwashing appliance 100, may include an arrangement of discharge ports or orifices for directing wash liquid received from circulation pump 152 onto dishes or other articles located in wash chamber 106. The arrangement of the discharge ports, also referred to as jets, apertures, or orifices, may provide a rotational force by virtue of wash liquid flowing through the discharge ports. Alternatively, spray assemblies 134, 142 may be motor-driven, or may operate using any other suitable drive mechanism. Spray manifolds and assemblies may also be stationary. The resultant movement of the spray assemblies 134, 142 and the spray from fixed manifolds provides coverage of dishes and other dishwasher contents with a washing spray. Other configurations of spray assemblies may be used as well. For instance, dishwasher 100 may have additional spray assemblies for cleaning silverware, for scouring casserole dishes, for spraying pots and pans, for cleaning bottles, etc.

Drainage of soiled wash liquid within sump 138 may by provided, for instance, by a drain pump 168 (e.g., during or as part of a drain phase). In particular, wash liquid may exit sump 138 through a drain outlet 167 and may flow through a drain conduit or directly to the drain pump 168. Thus, drain pump 168 is downstream of sump 138 and facilitates drainage of the soiled wash liquid by urging or pumping the wash liquid to a drain line external to dishwasher 100.

In some embodiments, a filter assembly may be provided, e.g., in the sump 138 and/or at a top entrance into the sump 138, e.g., to filter fluid to circulation assembly 150 and/or drain pump 168. Generally, the filter assembly removes soiled particles from the liquid that flows to the sump 138 from the wash chamber 106 during operation of dishwashing appliance 100. In exemplary embodiments, the filter assembly may include both a first filter (also referred to as a "coarse filter") and a second filter (also referred to as a "fine filter").

Although a separate circulation pump 152 and drain pump 168 are described herein, it is understood that other suitable pump configurations (e.g., using only a single pump for both recirculation and draining) may be provided.

The dishwashing appliance 100 may further include a heating element 184, such as a resistance heating element, positioned in or near the sump 138. For example, the heating element 184 may be positioned "near" the sump 138 in that the heating element 184 is disposed above the sump 138 and within the lower region 136 of wash chamber 106, such as below the lower spray arm 134 and/or below the lower rack assembly 122. The heating element 184 may be positioned and configured to heat liquid in the sump 138, such as for a heated wash phase, and/or to heat air within the wash chamber 106, such as for drying articles during a dry phase.

Dishwashing appliance 100 may also include ventilation features, e.g., to promote improved, e.g., more rapid, drying of articles therein after the wash and rinse phases. For example, one or more vents 170 may be provided in the tub 104 for introducing relatively dry air from outside of the tub 104 into the wash chamber 106 and/or for removing relatively humid air from the wash chamber 106 to the outside of the tub 104. In some embodiments, a fan 172 may be provided. The fan 172 may be operable to urge air through the wash chamber 106, such as to promote air circulation and/or ventilation within and through the wash chamber. Such air movement may increase the rate of evaporation of moisture from articles in the wash chamber 106 after a wash and/or rinse phase.

In certain embodiments, dishwasher 100 includes a controller 160 configured to regulate operation of dishwasher 100 (e.g., initiate one or more wash operations). Controller 160 may include one or more memory devices and one or more microprocessors, such as general or special purpose microprocessors operable to execute programming instructions or micro-control code associated with a wash operation or wash cycle that may include a pre-wash phase, a wash phase, a rinse phase, a drain phase, and/or a dry phase. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry—such as switches, amplifiers, integrators, comparators, flip-flops, AND gates, and the like—to perform control functionality instead of relying upon software. It should be noted that controllers as disclosed herein are capable of and may be operable to perform any methods and associated method steps as disclosed herein.

Controller 160 may be positioned in a variety of locations throughout dishwasher 100. In optional embodiments, controller 160 is located within a control panel area 162 of door 116 (e.g., as shown in FIG. 1 or FIG. 2). Input/output ("I/O") signals may be routed between the control system and various operational components of dishwasher 100 along wiring harnesses that may be routed through the bottom of door 116. Typically, the controller 160 includes or is operatively coupled to a user interface panel/controls 164 through which a user may select various operational features and modes and monitor progress of dishwasher 100. In some embodiments, user interface 164 includes a general purpose I/O ("GPIO") device or functional block. In additional or alternative embodiments, user interface 164 includes input components, such as one or more of a variety of electrical, mechanical or electro-mechanical input devices including rotary dials, push buttons, and capacitive touch controls, e.g., touchscreen. In further additional or alternative embodiments, user interface 164 includes a display component, such as a digital or analog display device designed to provide operational feedback to a user. When assembled, user interface 164 may be in operative communication with the controller 160 via one or more signal lines or shared communication busses.

The dishwashing appliance 100 may also include a temperature sensor 186 in operative communication with the controller 160. For example, in some embodiments, the temperature sensor 186 may be located in the sump 138 and may thereby be operable to measure a temperature of a liquid, e.g., wash liquid, within the sump 138. For example, the "temperature sensor" may include any suitable type of temperature measuring system or device positioned at any suitable location for measuring the desired temperature. Thus, for example, temperature sensor 186 may be any suitable type of temperature sensor, such as a thermistor, a thermocouple, a resistance temperature detector, a semiconductor-based integrated circuit temperature sensor, etc. In addition, temperature sensor 186 may be positioned at any suitable location and may output a signal, such as a voltage, to the controller 160 that is proportional to and/or indicative of the temperature being measured. Although exemplary positioning of the temperature sensor 186 is described herein and depicted in FIG. 3, it should be appreciated that dishwashing appliance 100 may include any other suitable number, type, and position of temperature, humidity, and/or other sensors as well as or instead of the exemplary temperature sensor 186 according to alternative embodiments.

It should be appreciated that the invention is not limited to any particular style, model, or configuration of dishwasher 100. The exemplary embodiments depicted in FIGS. 1 through 3 are for illustrative purposes only. For instance, different locations may be provided for control panel area 162 (e.g., on the front of the door 116 as illustrated in FIG. 1 or on the top of the door 116 as illustrated in FIG. 2, or other locations as well), different configurations may be provided for rack assemblies 122, 126, different spray assemblies 134, 142 and spray manifold configurations may be used, different sensors may be used, and other differences may be applied while remaining within the scope of the present disclosure.

Figure 4:
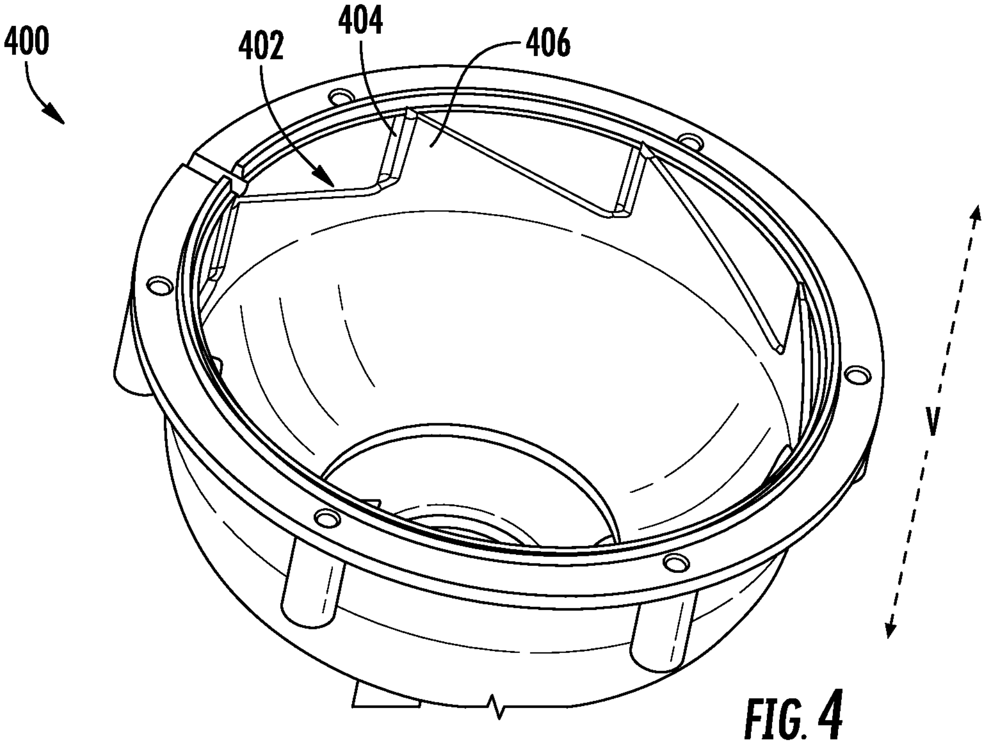
FIG. 4 provides a perspective view of an example embodiment of a first diffuser housing portion in accordance with aspects of the present disclosure.
Figure 5:
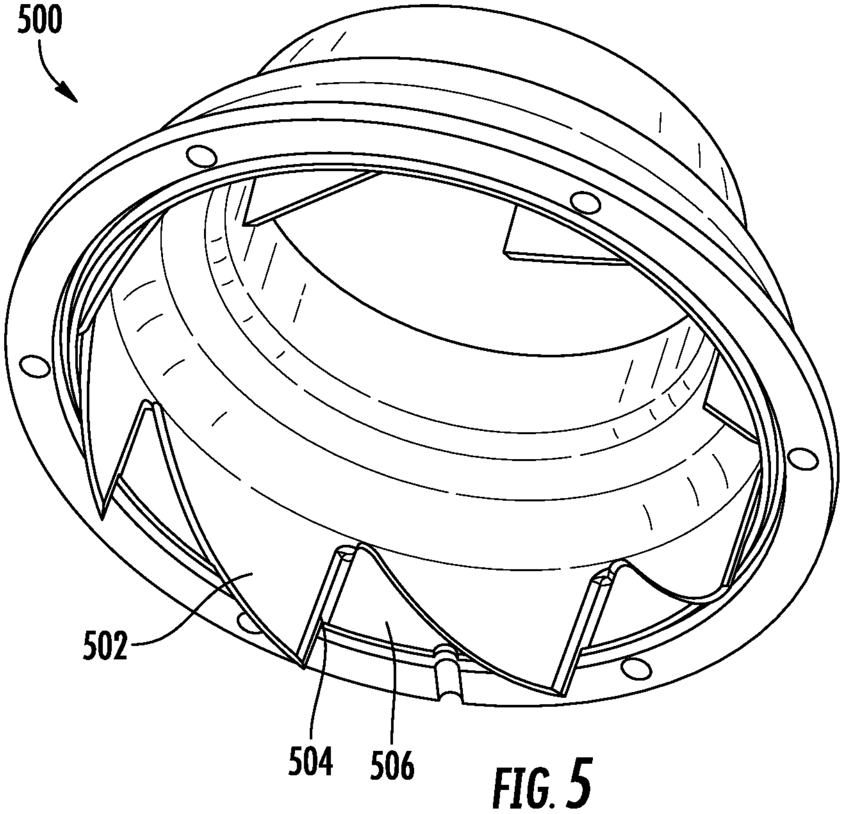
FIG. 5 provides a perspective view of an example embodiment of a second diffuser housing portion in accordance with aspects of the present disclosure.
Figure 6:
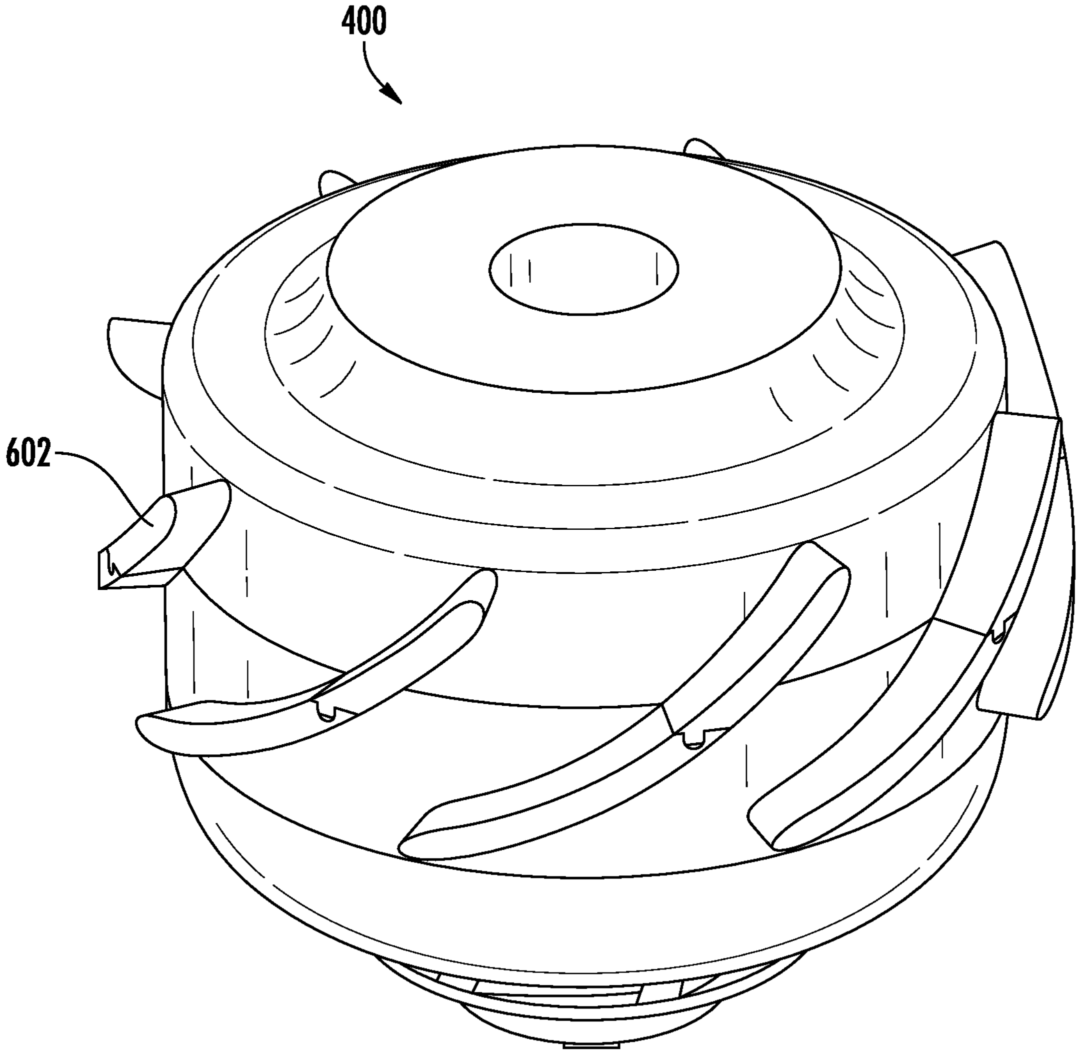
FIG. 6 provides a perspective view of an example motor housing in accordance with aspects of the present disclosure.
Figure 7:
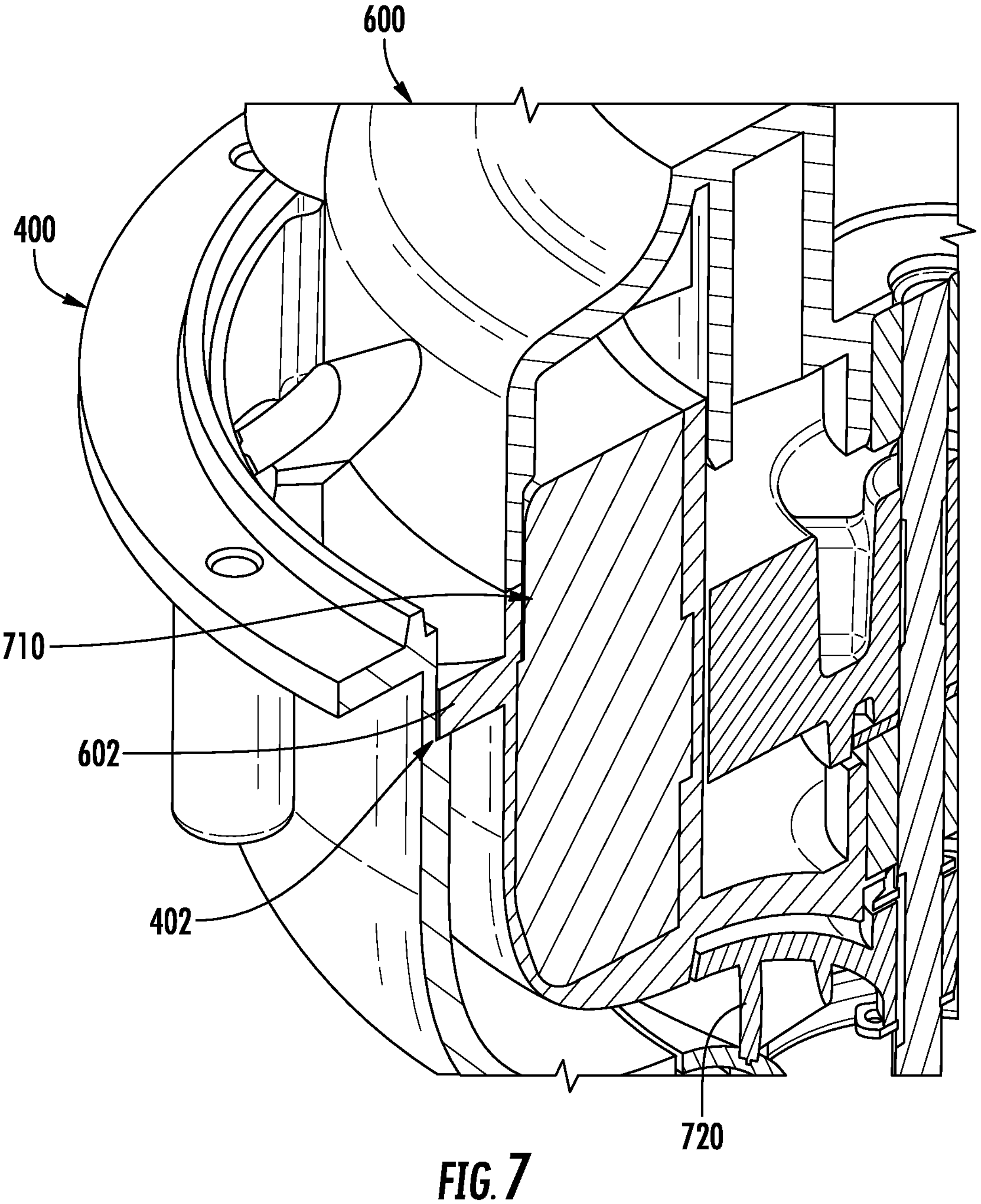
FIG. 7 provides a perspective, partial section view of the first diffuser housing portion of FIG. 4 with the motor housing of FIG. 6.
Figure 8:
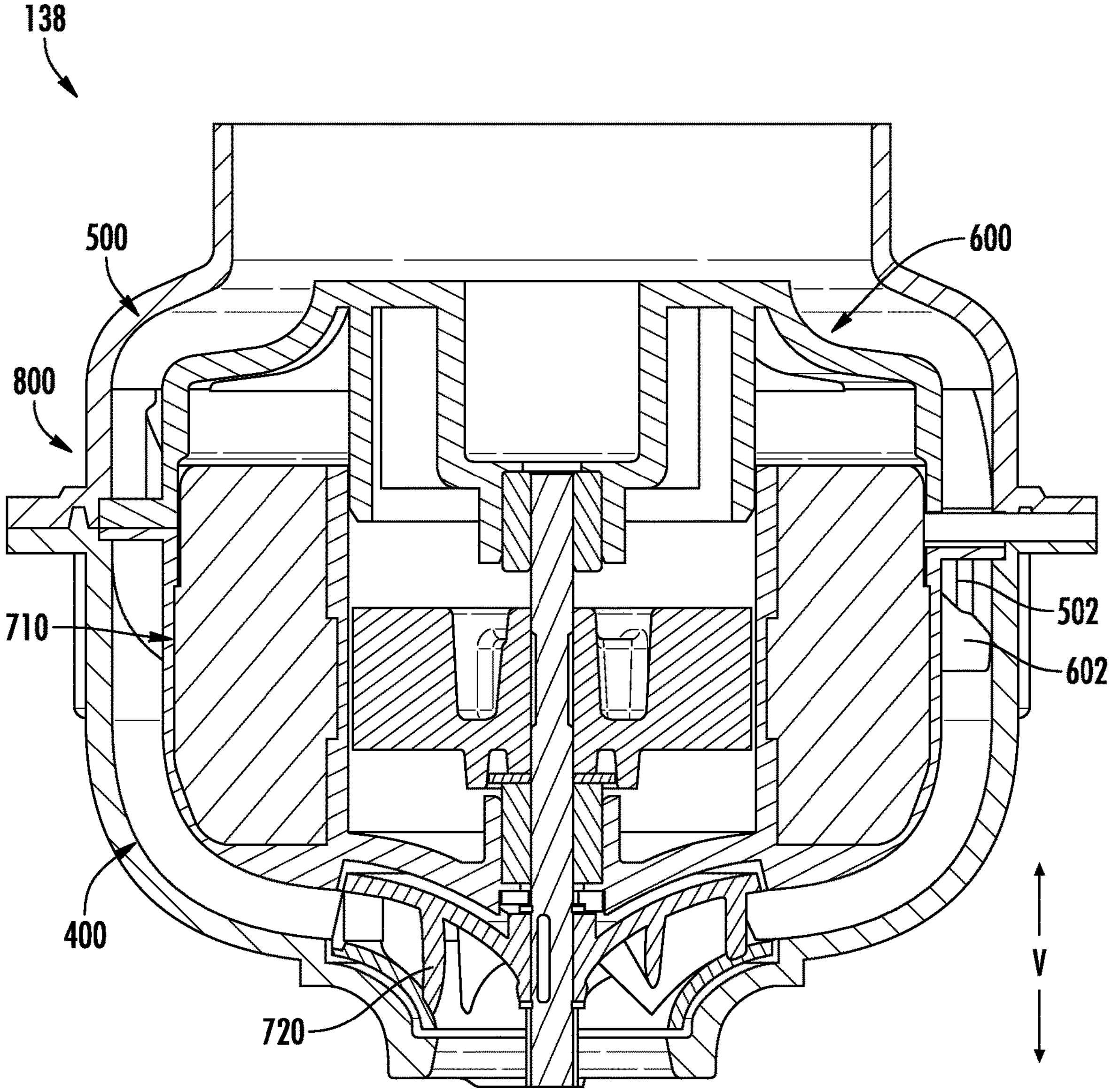
FIG. 8 provides a side section view of a centrifugal pump in accordance with aspects of the present disclosure.

Referring now to FIGS. 4 through 8, components of an example embodiment of sump 138 are illustrated. FIGS. 4 and 5 illustrates a first diffuser housing portion 400 and a second diffuser housing portion 500 of sump 138. Together, first diffuser housing portion 400 and second diffuser housing portion 500 form a diffuser housing assembly 800 (FIG. 8). As may be seen, first diffuser housing portion 400 may include groove 402. An edge 404 of groove 402 may be rounded to an interior surface 406 of first diffuser housing portion 400, e.g., that faces motor housing 600 within diffuser housing assembly 800. Second diffuser housing portion 500 may include extrusion 502. An edge 504 of extrusion 502 may be rounded to an interior surface 506 of second diffuser housing portion 500, e.g., that faces motor housing 600 within diffuser housing assembly 800. The rounding of edges 404, 504 of the groove 402 and extrusion 502, respectively, may assist with reducing turbulence in the fluid flow within diffuser housing assembly 800.

FIGS. 6 and 7 illustrate a diffuser vane 602 extending from a motor housing 600, and motor housing 600 positioned within first diffuser housing portion 400 with diffuser vane 602 engaging in groove 402, respectively. In the present example embodiment, a plurality of diffuser vanes 602, grooves 402, and extrusions 502 may be spaced circumferentially around each of the respective components. Diffuser vane 602 includes one end coupled to motor housing 600 and a distal end engaging with groove 402 of the first diffuser housing portion 400 and extrusion 502 of the second diffuser housing portion 500. Groove 402 may be shaped complementary to a surface of diffuser vane 602 (e.g., the surface of diffuser vane 602 at the distal end of diffuser vane 602) such that there is no or a negligible gap between diffuser vane 602 and groove 402. Also shown in FIG. 7 is a motor 710 with an impeller 720 coupled at one end of a rotatable shaft of motor 710, e.g., below diffuser vanes 602.

FIG. 8 illustrates diffuser housing assembly 800 including motor housing 600 mounted inside with impeller 720 coupled to motor 710. Diffuser vane 602 is shown with extrusion 502 of second diffuser housing portion 500. Extrusion 502 may be shaped complementary to a surface of diffuser vane 602, e.g., the surface opposing the surface contacted by groove 402 (e.g., at the distal end of diffuser vane 602), such that there is no or a negligible gap where the diffuser vane 602 contacts the diffuser housing assembly 800. Extrusion 502 of second diffuser housing portion 500 may enclose diffuser vane 602 into diffuser housing assembly 800.

Diffuser vanes 602 of motor housing 600 may be installed to extend axially to diffuser housing assembly 800. For example, motor housing 600 may be inserted into first diffuser housing portion 400 along the vertical axis V. Then, second diffuser housing portion 500 may be coupled to first diffuser housing portion 400. The complementary shape of both groove 402 and extrusion 502 may form uniform surface contact between diffuser vane 602 and diffuser housing assembly 800, which may prevent recirculation in diffuser housing assembly 800. The geometry of the diffuser housing assembly 800 and diffuser vane 602 may advantageously be injection molded, which is easier to manufacture compared to milling or tooling methods of manufacturing. In addition, each of the diffuser housing portions, e.g., first diffuser housing portion 400 and second diffuser housing portion 500, may have additional geometry extend to diffuser vane 602 to further establish surface contact thus further prevent recirculation.

As seen from the above, diffuser vane 602 may be manufactured and assembled into sump 138 such that recirculation from high pressure and lower pressure sides of diffuser housing assembly 800 may be prevented to reduce turbulence in the fluid flow paths. Diffuser vane 602 may engage with groove 402 and extrusion 502 of first diffuser housing portion 400 and second diffuser housing portion 500, respectively, in order to sealingly enclose diffuser vane 602 into diffuser housing assembly 800. Moreover, the geometry of the parts in the present disclosure may advantageously permit high speed manufacturing, as the parts may be injection molded, as compared to milled or tooled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising;

a tub defining a wash chamber; and a pump in fluid communication with the wash chamber, the pump comprising a motor housing, a motor disposed in the motor housing, a fluid impeller coupled to the motor, a diffuser housing assembly that comprises a first diffuser housing portion and a second diffuser housing portion, the first diffuser housing portion comprising a groove, the second diffuser housing portion comprising an extrusion, and a diffuser vane positioned on the motor housing, the diffuser vane engaging in the groove of the first diffuser housing portion, the extrusion of the second diffuser housing portion enclosing the diffuser vane into the diffuser housing assembly, wherein an edge of the groove of the first diffuser housing portion is rounded to an interior surface of the first diffuser housing, and wherein an edge of the extrusion of the second diffuser housing portion is rounded to an interior surface of the second diffuser housing.

2. The appliance of claim 1, wherein the diffuser vane comprises one end coupled to the motor housing and a distal end engaging with the groove of the first diffuser housing portion and the extrusion of the second diffuser housing portion.

3. The appliance of claim 1, wherein the groove of the first diffuser housing portion is one of a plurality of grooves spaced circumferentially around the first diffuser housing portion.

4. The appliance of claim 3, wherein the diffuser vane is one of a plurality of diffuser vanes spaced circumferentially around the motor housing.

5. The appliance of claim 4, wherein the extrusion of the second diffuser housing portion is one of a plurality of extrusions spaced circumferentially around the second diffuser housing portion.

6. The appliance of claim 1, wherein the groove of the first diffuser housing portion is shaped complementary to one surface of the diffuser vane and the extrusion of the second diffuser housing portion is shaped complementary to an opposing surface of the diffuser vane.

7. The appliance of claim 6, wherein the combination of the first diffuser housing portion and the second diffuser housing portion sealingly engages the diffuser vane.

8. A centrifugal pump, comprising:

a motor housing;

a motor disposed in the motor housing;

a fluid impeller coupled to the motor;

a diffuser housing assembly that comprises a first diffuser housing portion and a second diffuser housing portion, the first diffuser housing portion comprising a groove, the second diffuser housing portion comprising an extrusion; and a diffuser vane positioned on the motor housing, the diffuser vane engaging in the groove of the first diffuser housing portion, the extrusion of the second diffuser housing portion sealingly enclosing the diffuser vane into the diffuser housing assembly, wherein an edge of the groove of the first diffuser housing portion is rounded to an interior surface of the first diffuser housing, and wherein an edge of the extrusion of the second diffuser housing portion is rounded to an interior surface of the second diffuser housing.

9. The centrifugal pump of claim 8, wherein the diffuser vane comprises one end coupled to the motor housing and a distal end engaging with the groove of the first diffuser housing portion and the extrusion of the second diffuser housing portion.

10. The centrifugal pump of claim 8, wherein the groove of the first diffuser housing portion is one of a plurality of grooves spaced circumferentially around the first diffuser housing portion.

11. The centrifugal pump of claim 10, wherein the diffuser vane is one of a plurality of diffuser vanes spaced circumferentially around the motor housing.

12. The centrifugal pump of claim 11, wherein the extrusion of the second diffuser housing portion is one of a plurality of extrusions spaced circumferentially around the second diffuser housing portion.

13. The centrifugal pump of claim 8, wherein the groove of the first diffuser housing portion is shaped complementary to one surface of the diffuser vane and the extrusion of the second diffuser housing portion is shaped complementary to an opposing surface of the diffuser vane.

14. The centrifugal pump of claim 5, wherein the combination of the first diffuser housing portion and the second diffuser housing portion sealingly engages the diffuser housing assembly and the diffuser vane.

* * * * *